United States Patent [19]

Shramo et al.

[11] Patent Number: 5,200,661
[45] Date of Patent: Apr. 6, 1993

[54] SLOTLESS, BRUSHLESS, LARGE AIR GAP ELECTRIC MOTOR

[76] Inventors: Daniel J. Shramo; Susan M. Benford, both of 20791 Avalon Dr., Rocky River, Ohio 44116

[21] Appl. No.: 776,724

[22] Filed: Oct. 15, 1991

Related U.S. Application Data

[63] Continuation of Ser. No. 451,810, Dec. 15, 1989, abandoned.

[51] Int. Cl.$^5$ .............................................. H02K 3/00
[52] U.S. Cl. ...................... 310/184; 310/156; 310/197; 310/206; 310/207; 310/208; 310/258
[58] Field of Search .............. 310/254, 90, 44, 197, 310/68 R, 68 B, 156, 190, 179, 210, 180, 261, 181, 206, 207, 184, 258, 208, 182, 183; 335/301; 318/254

[56] References Cited

U.S. PATENT DOCUMENTS

| | | | |
|---|---|---|---|
| 847,008 | 3/1907 | Kitsee | 310/184 X |
| 2,903,610 | 9/1959 | Bessierev | 310/254 |
| 2,930,916 | 3/1960 | Scanlon | 310/156 |
| 3,883,633 | 5/1975 | Kohler | 310/181 |
| 3,968,390 | 7/1976 | Yasuda | 310/156 |
| 4,130,769 | 12/1978 | Karube | 310/179 |
| 4,156,168 | 5/1979 | Vogel . | |
| 4,292,558 | 9/1981 | Flick et al. . | |
| 4,292,559 | 9/1981 | Avinger | 310/179 |
| 4,355,255 | 10/1982 | Herr | 310/254 |
| 4,392,072 | 7/1983 | Rosenberry | 310/254 |
| 4,446,393 | 5/1984 | Finegold | 310/208 |
| 4,473,752 | 9/1984 | Cronin . | |
| 4,499,408 | 2/1985 | Bitting | 318/254 |
| 4,563,808 | 1/1986 | Lender . | |
| 4,564,777 | 1/1986 | Senoo | 310/211 |
| 4,594,523 | 6/1986 | Horith | 310/184 |
| 4,645,961 | 2/1987 | Malsky | 310/156 |
| 4,665,331 | 5/1987 | Sudo | 310/156 |
| 4,703,211 | 10/1987 | Yazaki et al. . | |
| 4,774,428 | 9/1988 | Konecny | 310/156 |
| 4,937,485 | 6/1990 | Mihalko | 310/208 |
| 5,001,375 | 3/1991 | Jones | 310/68 B |

Primary Examiner—R. Skudy
Attorney, Agent, or Firm—Renner, Otto, Boisselle & Sklar

[57] ABSTRACT

A slotless, brushless, large air gap electric motor comprises a stator having a field winding and field backiron, the field winding being composed of a plurality of successively offset polygonal shaped turns so as to provide a substantially flat winding, and a rotor disposed within the stator including a shaft with a permanent magnet mounted thereon. The field winding turns are preferably in the shape of a rectangle or a hexagonal. Also disclosed is a commutation scheme which dissipates energy stored in a section of the field winding previously energized to the section of the field winding subsequently energized; an integrated circuit for control of any motor using that commutation scheme; a winding configuration suitable for use with both an alternating and direct current power supply; and efficiency increasing magnetically permeable flux shorting elements.

15 Claims, 7 Drawing Sheets

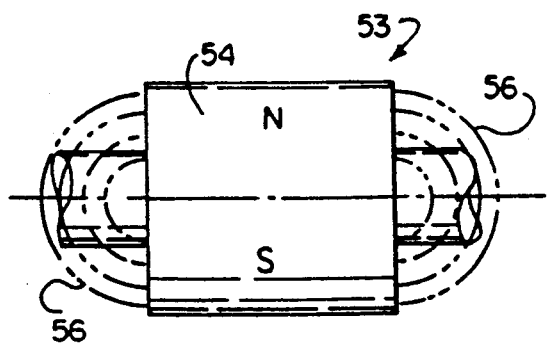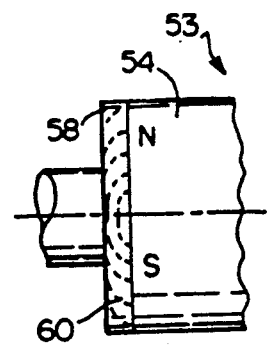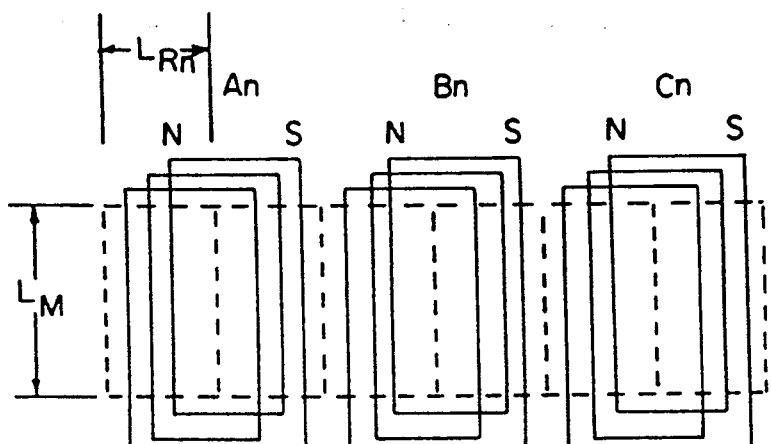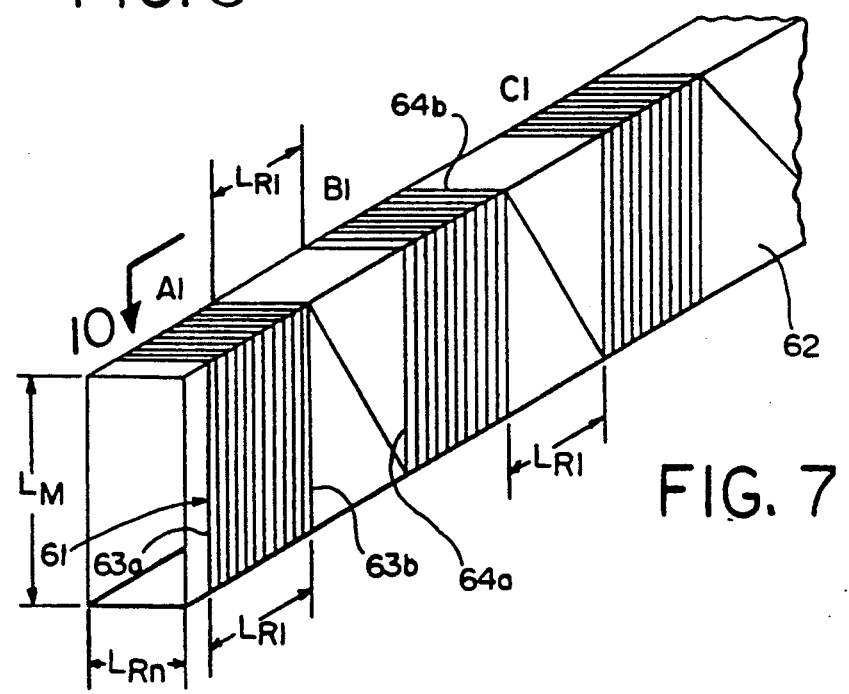

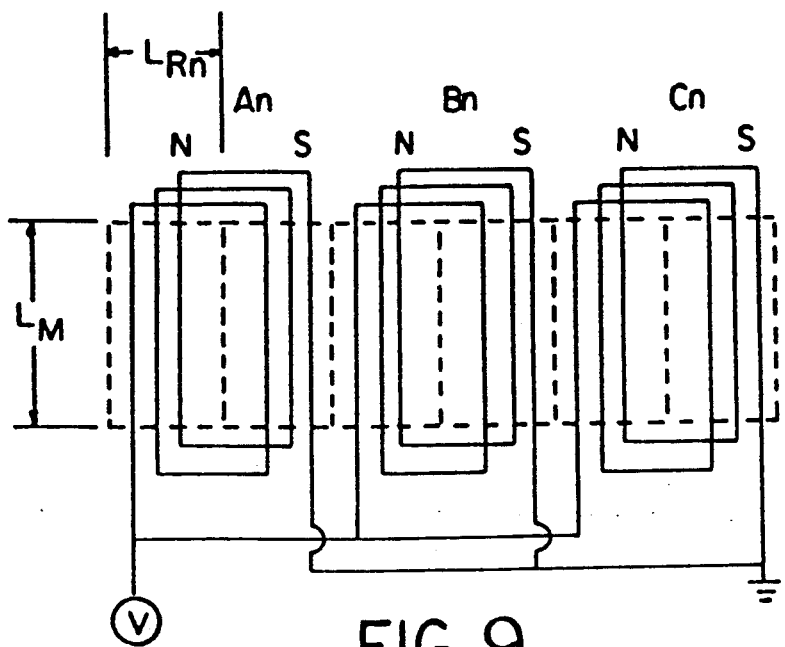
FIG. 9
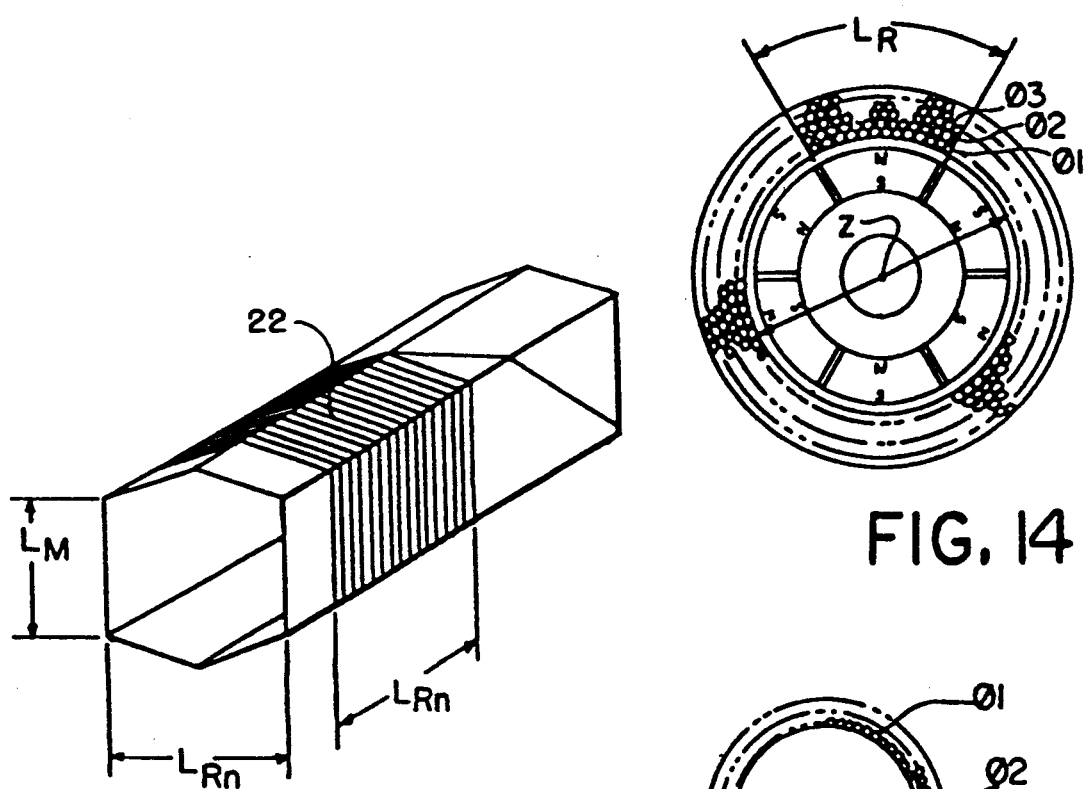
FIG. 14
FIG. 15
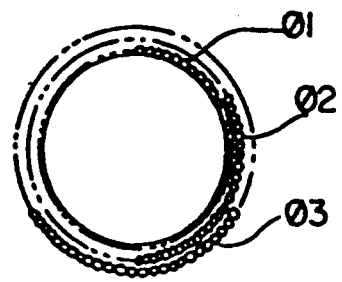
FIG. 13

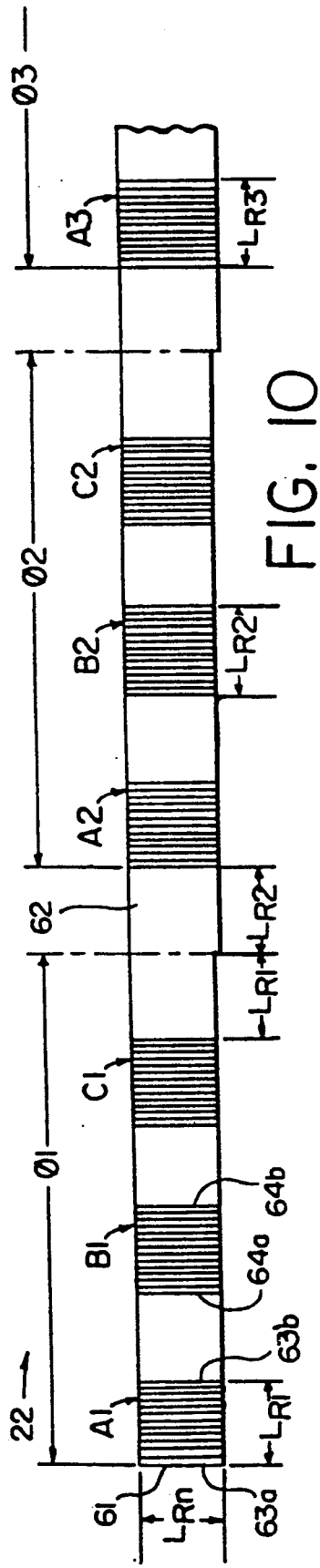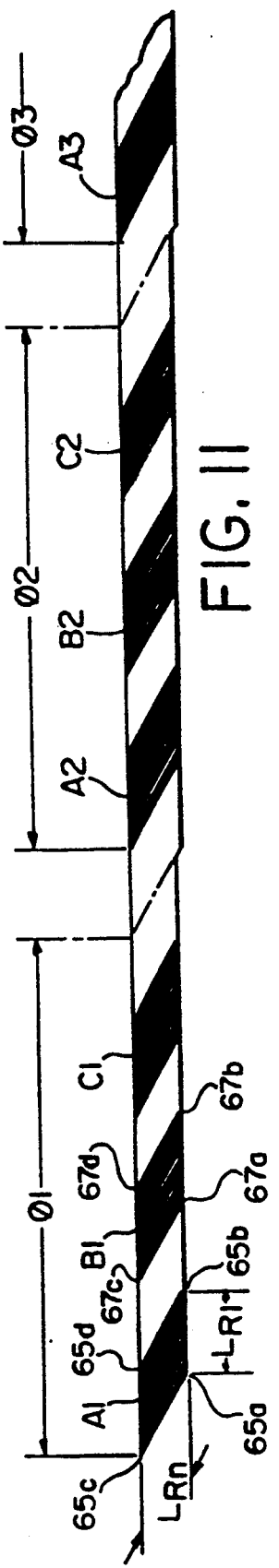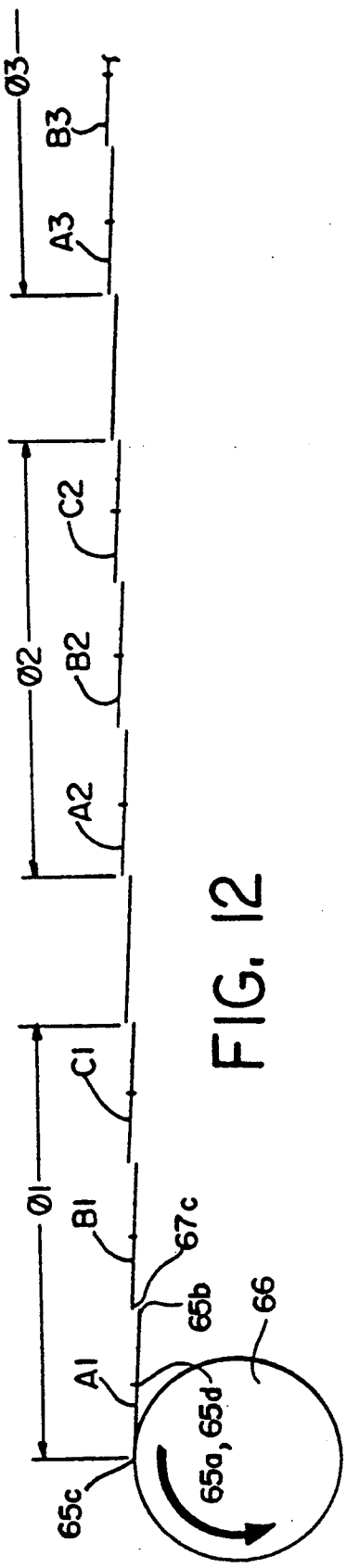
FIG. 10
FIG. 11
FIG. 12

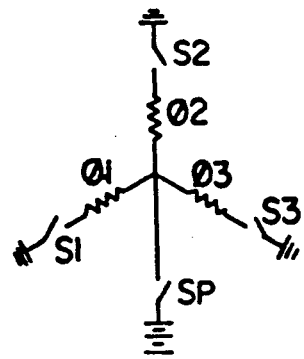
FIG. 17
FIG. 18
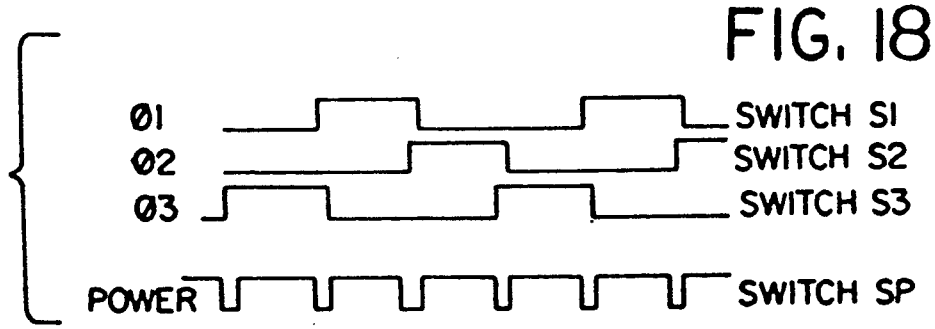
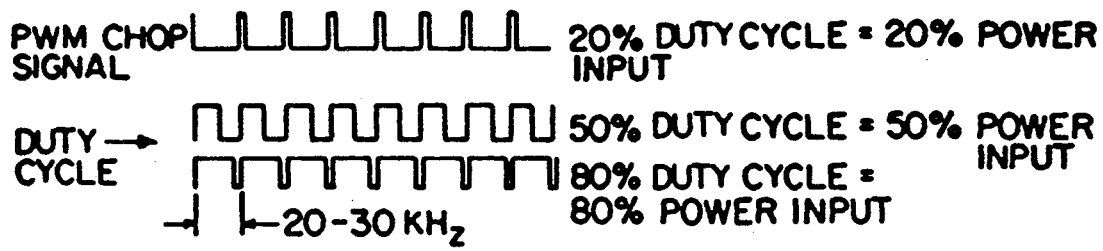
FIG. 19

SLOTLESS, BRUSHLESS, LARGE AIR GAP ELECTRIC MOTOR

This is a continuation of copending application(s) Ser. No. 07/451,810 filed on Dec. 15, 1989 now abandoned.

FIELD OF THE INVENTION

The invention relates generally to electromechanical devices such as electrical motors, generators and the like and, more particularly to slotless, brushless, large air-gap electrical motors.

BACKGROUND OF THE INVENTION

Slotless, brushless, large air-gap electric motors are well known and used in a variety of applications. These applications include use in power tools, consumer appliances, and the automotive industry to name but a few.

Due to the nature of this type of motor, for different applications, the motor must be substantially redesigned to provide the desired torque and horsepower. Additionally, a different electronics package ordinarily would be necessary to control each different motor. As a result of these factors and the difficulty of manufacturing slotless, brushless motors, the motors become a major cost factor for many of the items in which they are employed or in which it would be desirable to employ them. An example is in the power tools or appliances mentioned above. Consequently, reducing the cost of the motor in these and other appliances and applications would greatly impact the overall cost of the complete item. Moreover, in large, high volume applications for such motors, e.g., in the automobile industry, although the cost of one or even a few motors may not contribute significantly to the cost of an item, say an automobile, the overall motor cost as a result of volume would be significant and a reduction of that cost would be advantageous.

Slotless, brushless, large air-gap motors also are relatively inefficient. Some inefficiencies are due to hysteresis and eddy current losses as well as other losses that typically are dissipated as heat. Another exemplary inefficiency is the limitation on use with only one type of input electrical energy, namely either from a direct current or an alternating current power supply. Improving the efficiency of such motor and permitting its use with both types of power supplies interchangeably, would allow the motors to more readily be used in general and would expand the market for such motors. For instance, it would be desirable for such a motor to be used in an appliance, such as a hand drill, that would be able to run less hot than a conventional hand drill and that also either could be plugged into a wall outlet or alternatively could be powered by a battery pack.

SUMMARY OF THE INVENTION

The invention relates to improvements in slotless, brushless, large air gap motors. Such improvements concern efficiency of operation, ease of manufacturing, and versatility. The invention also relates to a commutation scheme and to a versatile electronic control package that can be used to control several (preferably any) motors designed in accordance with the commutation scheme of the invention, regardless of torque and horsepower characteristics.

Accordingly it is an object of the present invention to provide a high efficiency slotless, brushless, large air-gap motor.

It is another object of the present invention to simplify and to reduce the cost of manufacture of such a motor by automating the manufacture and employing a unique coil winding configuration.

Another object is to minimize the amount of coil wiring necessary to drive the motor.

Another object is to provide a commutation scheme that allows a common set of control electronics to be used for any size motor, which permits the control electronics to be an integral part of the motor assembly.

A further object is to provide a variable speed motor in which the speed is determined by modulating the pulse width of the applied power.

In accordance with one aspect of the present invention a slotless, brushless, large air-gap electric motor includes a stator having a field winding and field backiron; the field winding having a number of successively offset polygonal shaped turns so as to provide a substantially flat winding; and a rotor disposed within the stator including a shaft and a permanent magnet mounted thereon. The polygonal shaped turns may be in the shape of a rectangle or a hexagonal, for example.

In accordance with another aspect, a method of making a field winding for an electrical motor includes the steps of spirally winding a wire around a polygonal shaped form; leaving a space at predetermined distances, such space having a length of such predetermined distance; collapsing two opposite sides of such form so that the wire winding will substantially flatten to fill the empty spaces with successively offset turns of such winding having the approximate polygonal shape; and wrapping the flattened winding to form a hollow cylinder.

In still another aspect of the invention an electric motor includes a stator having a field winding and a field backiron, the field winding configured in a Wye with a commutation switch between each leg of the Wye and ground and a power switch between the common juncture of such Wye and a power supply; a rotor disposed within the stator including a shaft and a permanent magnet mounted thereon; and an integrated circuit controlling said switches.

In addition, according to another aspect, an electric motor includes a stator having a field winding and field backiron, and a rotor disposed within the stator including a shaft, a permanent magnet mounted thereon, and a pair of elements located on either side of the permanent magnet to complete a magnetic circuit between opposite poles of the permanent magnet.

According to another aspect of the invention a polyphase electric motor includes a stator having a field winding and a field backiron, the field winding configured in a Wye with a switch between each leg of the Wye and ground and a switch between the common juncture of such Wye and a power supply; and a rotor disposed within the stator including a shaft and a permanent magnet mounted thereon.

In addition, according to a further aspect, an electric motor includes a stator having a field winding and a field backiron, the field winding having sections for energizing by both rectified alternating current and direct current, and sections for energizing by rectified alternating current alone; and a rotor disposed within the stator including a shaft and a permanent magnet mounted thereon.

According to still another aspect of the invention a method of commutating a polyphase electrical motor includes the steps of sequentially applying power to a first field winding phase; interrupting power to the first field winding phase; dissipating energy stored in the first winding phase to a second winding phase; and applying power to said second winding phase.

These and other objects, advantages, features and aspects of the present invention will become apparent as the following description proceeds.

To the accomplishments of the foregoing and related ends, the invention, then, comprises the features hereinafter fully described in the specification and particularly point out in claims, the following description and the annexed drawings setting forth in detail a certain illustrative embodiment of the invention, this being indicative, however, of but one of the various ways in which the principals of the invention may be employed. It will be appreciated that the scope of the invention is to be determined by the claims and the equivalents thereof.

BRIEF DESCRIPTION OF THE DRAWINGS

In the annexed figures:

FIG. 5 is an illustration of the magnetic fields at both ends of a typical permanent magnet rotor;

FIG. 6 is an illustration of the magnetic fields at both ends of the rotor using a magnetic permeable element of the present invention;

FIG. 7 is an oblique view of the coil winding of the present invention wound around a form;

FIG. 8 is an illustration of an exemplary coil phase winding of the present invention wired in series;

FIG. 9 is an illustration of an exemplary coil phase winding wired in parallel;

FIG. 10 is a plan view of the coil winding illustrating the phase configuration;

FIG. 11 is a partially collapsed view of the coil winding;

FIG. 12 is an illustration of the coil winding as it would be wrapped around a cylindrical core;

FIG. 13 is a cross-sectional view of one segment of each phase of the coil winding;

FIG. 14 is a cross-sectional view of the complete coil winding and permanent magnet rotor;

FIG. 15 is an illustration of an alternate embodiment of a coil wrapped around a hexagonal winding form for use in the motor of FIG. 1;

FIG. 17 is a schematic view of the commutation section of the circuit of FIG. 16;

FIG. 18 is a diagram of the relative phase excitations of the respective coil sections and the supply power as a function of the angular position of the rotor of the motor of FIG. 1;

FIG. 19 is a diagram of the pulse width modulation scheme of the present invention;

DETAILED DESCRIPTION OF THE INVENTION

Figure 1:
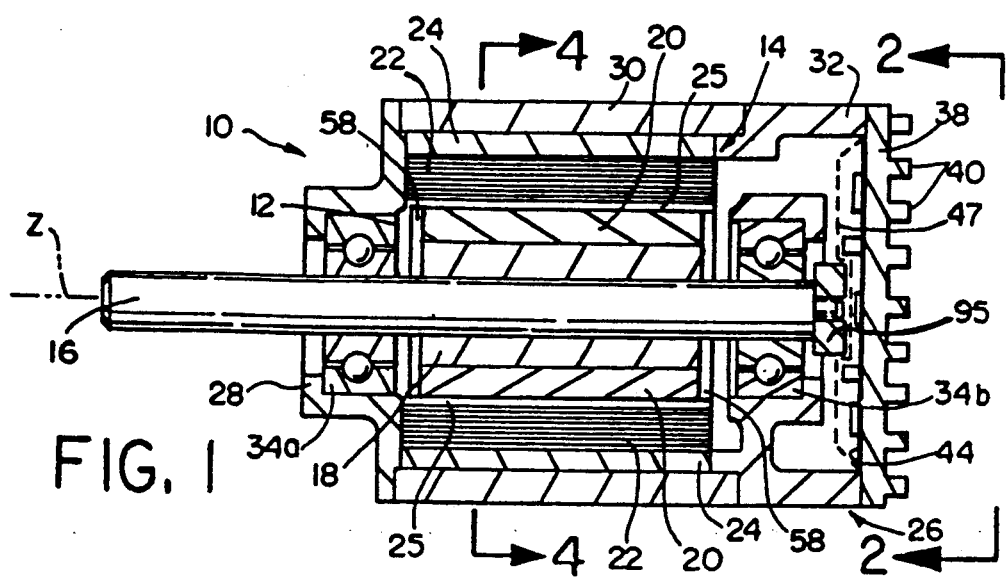
FIG. 1 is an illustration of a slotless, brushless large air gap motor according to the present invention.
Figure 2:
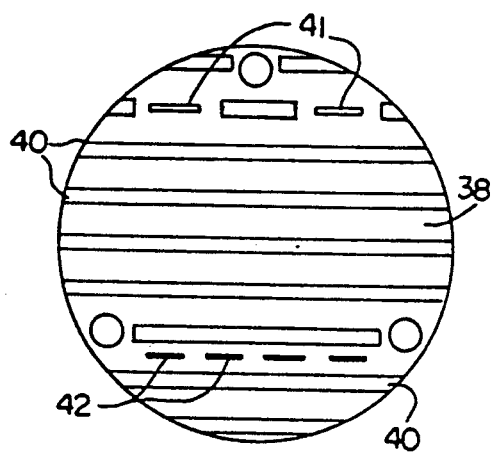
FIG. 2 is an end view of the motor showing the closed end looking in the direction of arrows 2—2 of FIG. 1.
Figure 3:
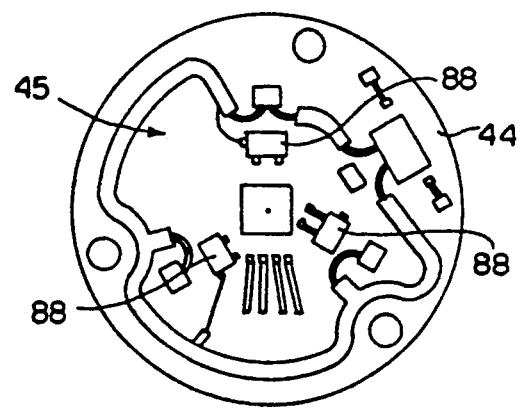
FIG. 3 is a plan view of the electronics package of the present invention.

With reference to the several figures in which like reference numerals depict like items and initially to FIGS. 1-4, there is shown a slotless, brushless, large air-gap electric motor 10 in accordance with the invention. The motor 10 includes a permanent magnet rotor assembly 12 and a wound stator 14 as is conventional in slotless, brushless motors. The rotor assembly 12 includes an elongate shaft 16 surrounded by a backiron core 18 which is, in turn, surrounded by a permanent magnet 20. The stator assembly 14 includes a coil winding 22 having an inner diameter to provide a space sufficiently large for the rotor to be disposed therein, and a field backiron 24 surrounding the coil winding. The area between the permanent magnet 20 and the inner diameter of the field backiron 24, partially filled by the coil winding 22, is referred to as the air gap 25.

The motor 10 further includes a housing assembly 26 having an open end section 28, middle section 30, and closed end section 32 for housing of the rotor and stator assemblies 12 and 14, respectively. The stator assembly 14 is fixed within the housing assembly 26 while the rotor assembly 12 is mounted so as to permit rotation around its longitudinal axis Z. The rotor assembly 12 is radially and axially fixed within the housing assembly 26 by a pair of bearings 34a, 34b mounted in the open and closed end housing sections 28, 32. Consequently, the rotor assembly 12 is free to rotate within the stator assembly 14. The rotor shaft 16 extends through the open end housing section 28 for attachment to a load, and the effectuation of relative rotation of that load.

In one embodiment of the invention to be described further below, the rotor assembly 12 may include a magnetically permeable element 58 located between the permanent magnet 20 and a respective bearing 34a or 34b at one or both sides of the permanent magnet to increase the efficiency of the motor 10.

A thermally conductive end member 38 in contact with the closed end housing section 32 forms the end closure of the motor 10 and seals the motor from contamination. The end member 38 is provided with a number of terminals 41 and 42 (FIG. 2), for connection to the power supply and motor control inputs, respectively. Mounted to the inward face of the end member 38 and electrically connected to the terminals 41 and 42 is a printed circuit board 44 (FIGS. 1 and 3 upon which is mounted the control electronics (designated generally at 46) of the motor 10. The circuit board 44 preferably is composed of a high dielectric constant plastic film, such as a thin Kapton TM substrate upon which circuit paths and mounting pads have been printed using well known methods. The control electronics circuit elements such as integrated circuits, transistors, Hall effect sensors, etc. are electrically and mechanically connected to the circuit board 44 using a standard lead bonding or similar technique. An electromagnetic interference (EMI) shield 47 (indicated by a dashed line) may be placed between the circuit board 44 and the rotor and stator assemblies 12, 14 to reduce the deleterious affects of electrical noise on the control electronics.

When running, the majority of heat generated within the motor 10 is from the stator assembly 14. To maintain the operating efficiency of the motor 10 and the reliable functioning of the electronics 45, it is beneficial to transfer the heat generated by the stator assembly 14 away from the rotor 12 and the electronics. Consequently, the housing sections 28, 30 and 32 are made of a material with a high coefficient of thermal conductivity. Also, by mounting the printed circuit board 4 directly to the thermally conductive end member 38, heat generated by the electronics 45 is effectively transferred to the end member. The end member 38 is preferably designed with fins 40 or other configurations which promote heat transfer to the surrounding environment further helping to maintain relatively cool operation of the electronics 45.

Figure 4:
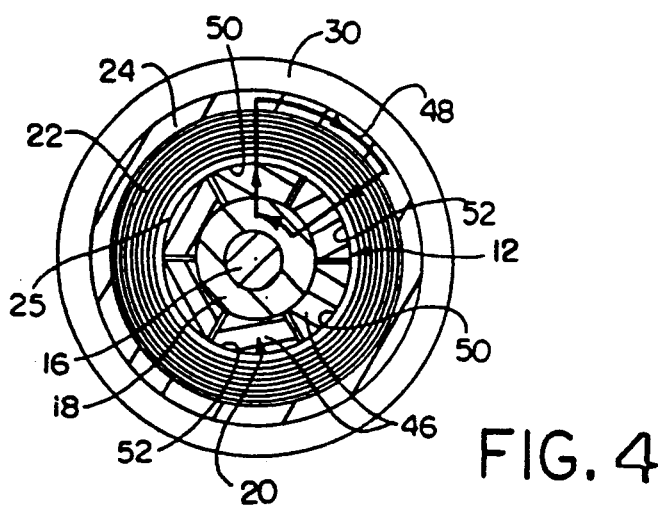
FIG. 4 is a cross-sectional view of the motor looking in the direction of arrows 4—4 of FIG. 1.

As is shown in FIG. 4, the permanent magnet 20 of the rotor 12 is divided into a number of sections 46, called pole segments, alternatively arranged with opposite magnetic poles, north and south, facing generally in a radially outward direction. In the preferred embodiment three pole pairs, or six magnet sections, are employed. The permanent magnet 20 may be constructed of six generally wedge-shaped separate magnet sections secured together or of a suitable material which may be magnetized appropriately by methods known in the art.

As referenced herein the permanent magnet 20 includes any material(s) or construction of material(s) which will produce a pole-to-pole magnetic field as described below. Also, it will be appreciated that while the following discussion is made with reference to a permanent magnet having three magnetic pole pairs, fewer or more magnetic pole pairs may be employed. For example, the invention may be used with a permanent magnet having 50 pole pairs or more, such as is typical in a stepper motor, or in a motor requiring a permanent magnet having only two pole pairs. Further, it will be appreciated that as used herein the phrases field winding, coil winding and coil are equivalent phrases denoting the element or elements of the stator that produce the stator magnetic field.

The opposite magnetic poles of the permanent magnet 20 create a pole-to-pole magnetic circuit, a portion of which is indicated generally at 48. Magnetic flux emanates from the northern pole faces 50 of the magnet 20 through the air gap 25 and the coil winding 22 to the field backiron 24 where it follows a generally arcuate path towards a southern pole face region. The magnet flux then passes back through the winding 22 and air gap 25 to the southern pole faces 52 and then through the rotor backiron 18 and back to the emanating pole faces 50.

When a current is appropriately applied to the coil winding 22 of the stator 14, a magnetic field is created which interacts with the pole-to-pole field created by the permanent magnet 20 of the rotor 12 to produce a reactant torque between the stator and the rotor. Since the rotor 12 is mounted in the bearings 34a and 34b it is free to rotate and will rotate a distance approximately equal to the arcuate length of two magnet pole faces 50, 52, or 120 degrees, to relieve the torque. As the rotor 12 rotates that distance, the current flow through the coil winding 22 is commutated to provide the next phase of rotation. For a three-phase motor the current must be sequentially applied to three different segments of the coil winding, called coil phases, to cause the rotor to rotate 360 degrees. Continually applying current to the coil phases sequentially accomplishes the continued rotation of the rotor.

The torque and horsepower characteristics of the motor 10 are determined by the reactive strengths of the magnetic fields created by the coil winding 22 and the permanent magnet 20. In general, the magnetic field strength generated by the coil 22 is a function of the number of coil turns and the amount of current flowing through the coil. The magnetic field strength of the permanent magnet 20 is a function of the size of the magnet and the type of material employed. The motor torque can thus be increased by adding coil turns, raising the current, using a larger permanent magnet, etc. However, the torque characteristics of the motor 10, and thus the efficiency of the motor can also be improved by eliminating magnetic flux losses through the various components of the motor so that the magnetic field interaction between the rotor 12 and the stator 14 is increased.

When the permanent magnet 20 rotates, a fluctuating magnetic field is produced in nearby stationary conductive motor elements, such as the field backiron 24, the bearings, 34a, 34b and the housing assembly 26. This fluctuating field is susceptible to losses attributable to hysteresis and eddy current flows. These losses can be reduced in the field backiron 24 by constructing it of wound layers or bundles of high permeability magnetic wire having a small cross-sectional area, as more fully described in copending U.S. patent application Ser. No. 07/453,616, filed Dec. 20, 1989, entitled Magnetic Flux Return Path for an Electrical Device which is hereby incorporated by reference. The small cross-sectional area of each wire reduces eddy current flows within the wire and minimizes skin effects associated with high frequency alternating current and harmonics thereof. The field backiron 24 can be manufactured using a conventional winding machine such as is used in producing field windings for conventional slotted electrical motors.

While it is necessary that the fluctuating magnetic field pass through the field backiron 24 to complete the magnetic circuit of the rotor 12, there are other components affected by the magnetic field that result in flux losses but produce no benefits, such as the bearings 34a, 34b and housing end sections 28, 32. Referring to FIG. 5, there is shown a four pole permanent magnet rotor 53 which may be used in a typical slotless, brushless motor. At either end of the magnet 54 there is illustrated diagrammatically a magnet flux circuit 56 established between the northern and southern magnetic poles of the permanent magnet 54 (represented in the figure by phantom lines). As the magnet 54 rotates, this magnetic flux circuit 56 passes through stationary conductive motor elements such as the bearings, etc., which is located between the permanent magnet 20 and a respective bearing 34a or 34b producing a fluctuating field in these elements with the associated hysteresis and eddy current losses.

According to the invention, such losses can be reduced by using a magnetically permeable flux shorting element 58 properly positioned with respect to the rotor 53 in the manner shown in FIG. 6. Placing a high magnetically permeable element 58, such as a soft iron washer, on the rotor magnetically at either end (o both ends) of the magnet 54 shorts the magnetic flux circuit 60 and greatly reduces such losses. As is illustrated in FIG. 6, the magnetic flux circuit 60 will be confined to the washer 58 which, since it is moving with the rotor 53, will have a constant flux. Since the flux is constant and confined in the washer, the field produced by that flux also is constant; therefore, the losses associated with a fluctuating field in general and with a fluctuating field in the bearings 34a, 34b and housing end sections 28, 32 in particular will not occur.

These improvements in reducing flux losses increase the strength of the rotor pole-to-pole magnetic field and correspondingly increase the reactant torque with the magnetic field of the coil winding. Since flux losses are dissipated as heat, reducing the losses will allow the motor to run cooler.

Turning now to FIGS. 7-15, features of a preferred coil structure according to the invention are illustrated and described. Initially, referring to FIG. 7, the first step for making a coil winding or field winding for the motor 10 is shown. Such coil winding may be used for one of the phases of the motor 10, for example, the first phase $\phi 1$ for a three phase motor. In FIG. 7, that first step employs a continuous conductor 61, such as an insulated copper wire, which is wound on a wiring form 62. The wiring form 62 is preferably of a rectangular shape. The form 62 has a height $L_M$ which corresponds to the axial length (direction of motor axis Z) of the permanent magnet 20 and a width $L_{R1}$ which corresponds to the circumferential, or arcuate, length of one section 46, or pole face 50, 52 of the permanent magnet.

Initially, a conductor 61 suitable for use in a coil winding, such as a small diameter insulated copper wire, is wrapped around the form 62 to establish plural coil segments, such as the three coil segments A1, B1, C1. The number of coil segments corresponds to the number of pole pairs of the motor 10. In wrapping the wire conductor 61 the first turn 63 a made is in the shape of a rectangle having a height $L_M$ and a width $L_{Rn}$, the dimensions of which correspond to the shape of the form 62. (The subscript "n" as used herein represents a coil phase designation; for example, for coil phase $\phi 1$, $L_{Rn}$ would represent $L_{R1}$, and so forth for the other coil segments.) The wire conductor 61 is continually wrapped around the form 62 with each added turn of wire conductor forming an additional adjacent rectangle. This operation is repeated until the cumulative length of the adjacent conductor turns (beginning at turn 63a and ending at turn 63b) is also equal to $L_{R1}$, thus completing the first coil section A1 of coil phase $\phi 1$. The next coil turn 64a is then begun spaced over a distance $L_{R1}$ from turn 63b of coil segment A1 to start the second coil segment B1. The balance of coil segment B1 is formed by wrapping multiple turns of the conductor 61 around the form 62 ending at turn 64b. Coil segment C1 is similarly made at a spacing $LR_1$ from coil segment B1. Thus, three equally spaced coil segments, A1, B1 and C1, each of length $L_{R1}$ and each spaced from the adjacent one a distance $LR_1$, are made. These three coil segments A1, B1 and C1 together with the spaces therebetween and the space $LR_1$ which also follows the last coil segment C1 collectively will be used to form one phase of the coil winding 22 (such as that denoted as the first phase $\phi 1$) having a total length of six times $L_{R1}$.

The process as explained above for wrapping the first phase $\phi 1$ of the coil winding 22 is similarly carried out to wrap the second and third phases, $\phi 2$ and $\phi 3$, respectively. However, in winding the second and third coil phases, the length and width of the respective coil segments, $A_n$, $B_n$ and $C_n$, thereof and the space therebetween will be increased to correspond to the increased arcuate length (at increased radial distance from the motor axis Z) which each subsequent phase of the coil winding 22 must follow when installed in the motor 10, as is explained more fully below. Consequently the width $L_{Rn}$ of the winding form 62 is increased at intervals that correspond to locations at which the respective longer length coil phases are to be wound thereon. In the preferred embodiment, all phases of the coil winding 22 are wound on a single form 62 continuously with appropriate lengths of coil wire tapped to make the necessary circuit connections for each coil segment, $A_n$, $B_n$ and $C_n$, of each phase of the coil. Alternatively, each coil segment may be wound on separate respective forms 62 which have appropriate size characteristics.

FIGS. 8 and 9 show exemplary wiring configurations for representative coil turns that form the coil segments of one phase of the coil winding 22 as it would be seen when it is activated or electrically energized as when receiving electric energy. Referring first to FIG. 8 the coil phase shown is electrically connected in series. The first coil segment An of conductor wound to form the phase is tapped and connected to the power supply V, and the conductor continues unbroken until it reaches the end of the phase winding where it is tapped and attache d to g round. A parallel configuration for representative coil turns forming the coil segments of one phase of the coil winding 22 is shown in FIG. 9. The conductor at the beginning of each phase segment $A_n$, $B_n$ and $C_n$ is tapped and connected to the power supply V, and the last conductor wrapping for each coil segment is tapped and connected to ground. In the latter configuration each coil segment $A_n$, $B_n$ and $C_n$ is actually a separate circuit or is connected as a separate circuit. Each coil phase $\phi 1$, $\phi 2$ and $\phi 3$ would be similarly wired in one of the above ways.

Whether the coil 22 is connected in series or in parallel depends on the application of the motor 10 and the available power supply. In a situation where a high voltage, low current power source is available the coil 22 ordinarily would be wired in series to minimize power losses across the coil. In a low voltage, high current situation ordinarily it would be desirable to wire the coil in parallel to provide the appropriate potential difference across a coil segment.

When wired in either configuration, a magnetic field will result around the coil winding 22 when a current is applied. As current flows through each turn of the coil 22, a magnetic field is created. The fields of the closely spaced turns merge together to create a cumulative magnetic field having opposite poles at either end of the phase segment.

The coil winding 22 for three phases is shown in FIG. 10 looking down onto the top of the wound form 62 relative to the illustration of FIG. 7 without the circuit connections described above. The coil winding 22 has coil phases $\phi 1$, $\phi 2$ and $\phi 3$, each of which is composed of coil segments $A_1$, $B_1$, $C_1$; $A_2$, $B_2$, $C_2$; and $A_3$, $B_3$, (not shown in FIG. 10). $C_3$, (not shown in FIG. 10), respectively. Each of the respective coil segments, such as the coil segment $A_n$, or the coil segment $B_n$, etc., has a length $L_{Rn}$ and a height $L_{Rn}$. The space between each coil segment is $L_{Rn}$ and the space between adjacent coil phases (a coil phase is the assembly of coil segments $A_n$, $B_n$, etc. forming such coil phase, such as the first phase $\phi 1$) is approximately $L_{Rn}$. In some applications the space between adjacent coil phases may be less than $L_{Rn}$ to provide an overlap between the wrapped coil phases and to improve torque characteristics of some motors, for example, depending on the application of the motor 10, as is known. If desired, the coil 22 on the form 62 (or after it has been removed from the form 62) may be coated with a thermally conductive, electrically insulating material such as an insulating varnish which will loosely hold the wiring of the coil segments together.

The next step in making the coil winding 22 is to deform the winding at least partly to flatten it so that the coil segments which make up respective coil phases can be wrapped in a circumferential fashion described below. Accordingly, relative to the illustration of FIG. 10, the coil winding 22 is collapsed in the width dimension of the winding form 62 by rotating the bottom corners 65a, 65b of coil segment $A_1$, 67a, 67b of coil segment $B_1$, etc. of the coil winding 22 counterclockwise. Partially rotated and collapsed coil winding 22 and form 62 are shown in FIG. 11. At this point the partially collapsed form 62 preferably is removed from within the coil winding 22. However, if the coil winding 22 has adequate dimensional integrity, the form 62 may be removed prior to the collapsing step.

The corners 65a, 65b, etc. are rotated a total of approximately 90 degrees, thus substantially fully flattening the coil 22. This fills in the empty spaces originally between adjacent coil segments and thus provides coil segments that have a segment length of two times $L_{Rn}$. The effect of this collapsing action is to create a coil winding 22 with coil phases that have an alternating magnetic polarity across each distance $L_{Rn}$, when electrically energized. The flattened coil 22 may then be coated or re-coated with a varnish or similar material which will maintain the dimensions of the coil and may also facilitate thermal conduction.

The just described collapsing action is analogous to the relative movement of two opposite flat surfaces of a parallelogram undergoing relative shear. As those surfaces move in opposite directions, the parallelogram collapses, thus bringing the planes of those two surfaces closer together and ultimately to a coplanar relation. If the parallelogram is a square, then upon full collapse the two mentioned opposite surfaces will be substantially coplanar and one pair of originally diagonally related corners, e.g. corners 65a, 65d of FIG. 11, will orient in adjacent relationship. Similarly, with reference to FIG. 11, as the multiple parallelograms formed by the coil segments $A_1$, $B_1$, etc. collapse, a pair of corners such as corner 65b and corner 67c of sequential coil segments meet in adjacent substantially coplanar relationship, as is depicted in FIG. 12.

The finished coil 22 is then wrapped around a cylindrical core 66, as is shown in FIG. 12, with an outer dimension sufficient to allow the rotor assembly 12 to rotate freely within the wrapped coil winding 22. The first coil phase $\phi 1$, still having a length of six times $L_{R1}$ even after having been collapsed, is intended to wrap around the core 66 exactly once. Since there is an unfilled space having a length of $L_{R2}$ between the first coil phase $\phi 1$ and the second coil phase $\phi 2$, the second coil phase will have its first coil segment $A_2$ offset from the first coil segment $A_1$ of coil phase $\phi 1$ by one magnet pole face minus any desired overlap, as is shown in FIG. 13. The same applies for the third coil phase $\phi 3$ which, when wrapped around the core 66, will be offset from the second coil phase $\phi 2$ by one magnet pole face.

This illustrates the need for the second and third coil phases $\phi 2$, $\phi 3$ to have a larger width and segment length, $L_{Rn}$, than the preceding coil phase. When the second coil phase $\phi 2$ is wrapped it must be long enough to cover not only the circumference of the core 66 but also the increased circumference attributable to the first coil phase $\phi 1$. Similarly, the third coil phase $\phi 3$ must have a length sufficient that it will wrap completely around the core 66, the first coil phase $\phi 1$ and the second coil phase $\phi 2$. The increased dimensions of $L_{R2}$ and $L_{R3}$ allows the phase segments, $A_n$, $B_n$ and $C_n$, of the second and third coil phases $\phi 2$ and $\phi 3$, respectively, to cover the arcuate length of each magnet pole face at the increased diameter, as is shown in FIG. 14.

As a result of the foregoing collapsing and wrapping procedures, the turns in each segment will be circumferentially offset from one another. As best illustrated in FIGS. 8 and 9, relatively adjacent turns in each segment will have circumferentially opposite sides thereof circumferentially offset with respect to one another in the same circumferential direction. This is in contrast to conventional coil segments where circumferentially opposite sides of relatively adjacent turns are circumferentially offset with respect to one another in opposite circumferential directions.

If the torque requirements of the motor necessitate more coil turns, further sets of coil phase windings are wound upon the core 66 and the preceding set or sets. As above, the coil phases of each further set would consequently have an increased segment length and width dimension $L_{Rn}$ to accommodate the increasing distance from the magnet pole face. Each coil phase would be electrically connected in the same way as its corresponding coil phase in the first set as described above.

In an alternate embodiment of the invention the winding form 62 may have a hexagonal cross section, as is shown in FIG. 15. In this embodiment a coil winding 22 is produced which will come to a point at the midpoint of each of its widths. When collapsed, this coil configuration tends to lay flatter than the rectangular coil and thus may allow more coil turns to be placed in the air gap 25 of the motor 10. Similarly, other geometric configurations can be employed which would tend to promote a coil winding which can be collapsed flat and easily wound.

After the coil winding is in place and secured together by a further coating of varnish, by drying of a previous coating, by the stiffness of the conductor 61 itself, or by some other means, the coil 22 is secured within the previously formed, assembled, wound, etc. field backiron 24 such as by potting. The cylindrical core 66 is removed before or after placing the coil winding 22 in the space circumscribed by the field backiron 24. Alternatively, the field backiron 24 may be wound directly upon the completed coil winding 22, thus allowing flexibility in the dimensional tolerances of the field backiron and coil winding.

A particular advantage of the winding configurations described above over many recently proposed winding configurations is that the winding process can be performed using conventional winding machines and thus can be accomplished inexpensively. The winding configuration of the present invention also provides a denser packing of electrical conductor turns in the air gap 25 than is possible with many conventional windings, thus permitting more coil turns in the same area and a stronger stator magnetic field.

Figure 16:
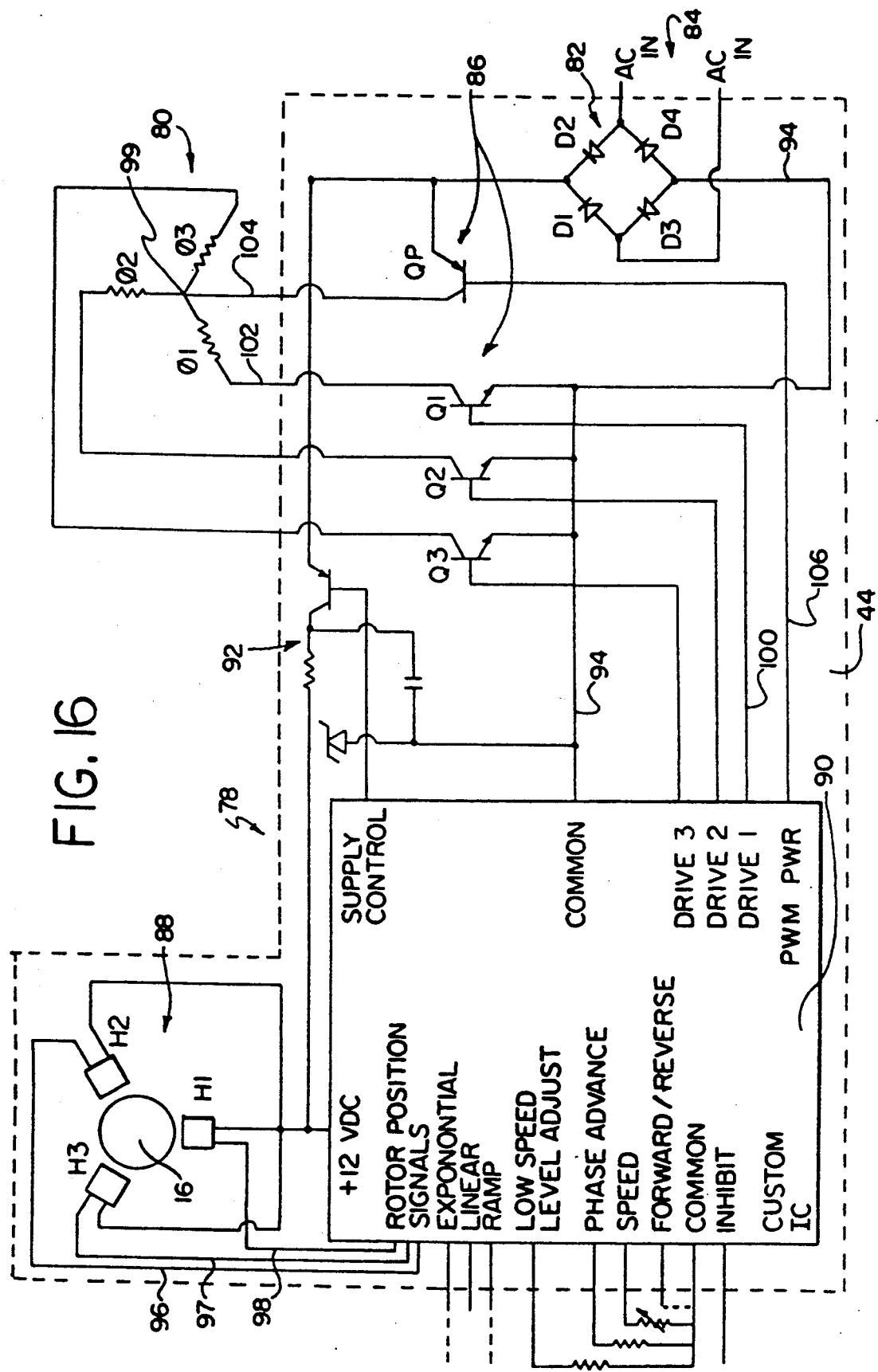
FIG. 16 is a schematic electrical circuit diagram of the motor and control circuitry of the present invention.

To establish the magnetic field in the stator 14 that is necessary to drive the rotor 12, the completed field winding 22 is electrically connected as in the manner shown in FIGS. 16 and 17. The components surrounded by the dashed line in FIG. 16 constitute the electronics package 78 for the motor 10. The other components are the separate coil phases $\phi 1$, $\phi 2$ and $\phi 3$ of the coil winding 22 connected in a conventional Wye commutation configuration 80 for a three phase motor.

While the field winding and commutation circuit are configured for use in a three phase motor, one with ordinary skill in the art will appreciate that the invention may be employed in any polyphase motor with similar results.

The electronics package 78 illustrated in FIG. 16 preferably may be mounted directly in the motor housing 26, e.g. being formed and/or constructed on the printed circuit board 44. The electronics package includes power circuitry 82 for providing unfiltered full wave rectified power from an alternating current power source 84; commutation and power transistors 86 for controlling current flow to and between each of the coil phases $\phi 1$, $\phi 2$ and $\phi 3$; position sensors 88 for determining the rotor shaft 16 angular position; an integrated circuit 90 for controlling the commutation and power transistors 86; and a power conditioning circuit 92 for supplying 12 volt direct current power to the position sensors 88 and the integrated circuit 90. The power circuitry 82 is a conventional rectifying circuit composed of four diodes $D_1$, $D_2$, $D_3$ and $D_4$. The conditioning circuit 92 is also a conventional circuit for converting rectified alternating current into 12 volt direct current.

The integrated circuit 90 uses standard logic elements available from custom IC manufacturers combined to provide the functions which will be discussed herein. Given the discussion below of the inputs, outputs and required functions of the integrated circuit, one skilled in the art could design the physical IC with reasonable effort. If desired, those functions alternatively may be carried out by discrete components, but in such case the size of the electronics package 78 may become too large for mounting within the motor housing 26.

The integrated circuit 90 has several outputs, including three drivers, DRIVE 1, DRIVE 2 and DRIVE 3, to switch the commutation transistors Q1, Q2, and Q3; a switch driver PWM PWR, which preferably is pulse width modulated, to drive the power transistor QP; a common/power ground reference, COMMON; and a 12 volt DC SUPPLY CONTROL. The integrated circuit 90 has several inputs, including a 12 volt DC power input; three input signals from the position sensors 88; an INHIBIT signal that may be used to latch the commutation transistors, Q1, Q2, Q3 and the power transistor QP in the nonconducting state such that the motor will not run even if power is applied to the power supply 84; and a number of motor control inputs, for example for speed, direction and power control purposes.

The motor control inputs are COMMON, FORWARD/REVERSE, SPEED, PHASE ADVANCE, and LOW SPEED LEVEL ADJUST. All of these signals are at low power signal logic level. FORWARD/REVERSE is accomplished by opening or shorting the signal to COMMON. This can be accomplished internal to the motor for a fixed direction, clockwise/counterclockwise, application or via an external contact for reversing motor applications. SPEED is provided via an external variable resistance between the speed tap and signal common to provide for variable speed through pulse width modulation of commutation power as is discussed below. PHASE ADVANCE is an input from an external or internal resistor to allow adjustment of the phase to improve high speed operation. LOW SPEED LEVEL ADJUST is an input from an external or an internal fixed resistor between COMMON and LOW SPEED LEVEL ADJUST to fix the maximum speed of the motor. Three additional inputs, RAMP, LINEAR and EXPONENTIAL, provide a ramp, linear, or exponential function acceleration, respectively, for specialized motor applications. All of these inputs are low level logic signals from external inputs.

The integrated circuit 90 processes the motor control low level logic signal inputs to determine the characteristics of the output signals described above. For example, the integrated circuit 90 processes the input signal LOW SPEED LEVEL ADJUST to determine the maximum duty cycle of pulse width modulated output PWM PWR which drives the power transistor QP.

Commutation of the coil phases $\phi 1$, $\phi 2$; and $\phi 3$ is explained with respect to FIGS. 16–18. Each coil phase $\phi 1$, $\phi 2$ and $\phi 3$ is connected to ground through a commutation transistor, Q1, Q2 and Q3, respectively. Power is supplied to the coil Wy circuit 80 through the power transistor QP. In FIG. 17 the commutation transistors Q1, Q2 and Q3 are represented as switches, S1, S2 and S3, respectively, which couple the coil phases $\phi 1$, $\phi 2$ and $\phi 3$ to a source of ground reference potential 94 as controlled by the integrated circuit 90. The power transistor QP is represented as the switch SP which couples the commutation circuit 80 to unfiltered full wave rectified power also as controlled by the integrated circuit 90.

The position of the rotor 12 relative to the coil phases is detected by three position sensors 88 mounted on the circuit board 44 adjacent the rotor shaft 16 at 120 degree intervals. The position sensors are preferably Hall effect sensors which sense the shaft position by sensing the rotational position of a ring magnet 95 (shown in FIG. 1) on the rotor shaft 16. Alternatively, the position sensors may be photodiodes which detect shaft position by reflecting light off of a reflective surface of the shaft 16, or other equivalent position sensing devices. The outputs of the position sensors are coupled to the integrated circuit 90 via lines 96, 97 and 98 which determines from those signals whether to open or to close the switches SP, S1, S2 and S3. FIG. 18 illustrates the desired state that the switches SP, S1, S2 and S3 should assume as a function of the position of the rotor shaft 16. The vertical axis in FIG. 18 represents the state of the switches with the higher signal indicating that the switch is closed and a lower signal indicating that the switch is open. The horizontal axis represents the angular position of the rotor shaft 16 with the length of the axis totaling approximately two revolutions or 720 degrees for illustrative purposes.

When the rotor is at rest, the integrated circuit 90 uses the shaft position information obtained from the position sensors 88 along with the FORWARD/REVERSE motor control input to determine which coil phase to energize first to begin rotation of the rotor. Commutation sequencing i.e., $\phi 1$, $\phi 2$, $\phi 3$, $\phi 1$ etc. or $\phi 3$, $\phi 2$, $\phi 1$, $\phi 3$ etc. is determined from the level or sign of the FORWARD/REVERSE input to produce the desired directional rotation (clockwise/counterclockwise).

The commutation circuit 80 is controlled through the commutation and power transistors 86 by the integrated circuit 90 in the manner illustrated in the commutation logic table below (Table 1). In the table a numeral '1' represents a switch in the closed, or conducting position and a numeral '0" represents an open or nonconducting switch.

COMMUTATION LOGIC TABLE

|    | φ1 | φ1 | φ2 | φ2 | φ3 | φ3 |
|----|----|----|----|----|----|----|
| SP | 0  | 1  | 0  | 1  | 0  | 1  |
| S1 | 1  | 1  | 1  | 0  | 0  | 0  |
| S2 | 0  | 0  | 1  | 1  | 1  | 0  |
| S3 | 1  | 0  | 0  | 0  | 1  | 1  |

As can be seen from Table each commutation phase φ1, φ2 and φ3 has an ON and an OFF cycle corresponding to whether the power switch SP is supplying current to that coil phase. Assuming the motor 10 is running with power supplied to coil phase φ3 with SP and S3 closed, as the rotor reaches a certain angular position, the power switch SP is opened and switch S1 is closed (see column 1 of Table 1). With S1 closed, the residual power stored in coil phase φ3 flows to coil phase φ1 when S3 is opened. This begins energizing coil phase φ1 with residual energy from coil phase φ3 which conventionally would have been dissipated in a bypass device as heat. Since switch S1 is closed just prior to S3 being opened, the inductive spike is also eliminated by allowing the current to flow from coil phase φ3 to coil phase φ1. The power switch SP is then closed allowing current to flow to coil phase φ1 to completely energize it (Table 1, Col. 2). The magnetic field thus created in energized coil phase φ1 interacts with the pole-to-pole magnetic field of the rotor 12, thus producing a reactant torque which rotates the rotor an angular distance of approximately two pole faces or 120 degrees.

Subsequently, the power switch SP is opened disabling current flow to the commutation circuit and switch S2 is closed (Col. 3). When switch S1 is opened, residual energy stored in previously energized coil phase φ1 will then flow to coil phase φ2 beginning its activated stage. When the power switch SP is again closed, the coil phase φ2 will be energized creating a magnetic field and causing the rotor 12 to rotate another 120 degrees (Col. 4). The power switch SP is then opened, S3 closed and S2 opened to energize coil phase φ3 with the residual power from coil phase φ2 (Col. 5). When power is again applied (Col. 6), coil phase φ3 will also create a magnetic field which interacts with the pole-to-pole magnetic field of the rotor 12 to complete one 360 degree rotation of the rotor. This sequence is repeated continuously to provide commutative power to the motor 10.

The power switch SP is closed allowing current to flow to the next sequential coil phase, as described above, at the same time as the commutation switch from the previously energized coil phase is opened or soon thereafter, as determined by the rotational position of the shaft. Alternatively, the potential voltage between the commutation circuit juncture 99 (FIG. 16) and power supply 84 can be measured, and the power switch SP closed when the potential difference reaches approximately zero.

The commutation circuit switching described above is actually accomplished in the transistors Q1, Q2 and Q3. When shaft position signals 96, 97, 98 received by the IC 90 indicates the coil phase 01 is to be conducting to ground 94 (switch S1 in FIG. 17 closed) a high or active signal is output from DRIVE 1 over Line 100 to the transistor Q1. This drives the Q1 transistor and grounds Line 102 which is connected to coil phase φ1, thus allowing current to flow through coil phase φ1. Switching for the other coil phases φ2 and φ3 is performed in the same manner with transistors Q2 and Q3, respectively. Current is supplied to the coil phases over line 104 by the transistor QP when the IC 90 drives PWM PWR (line 106) to a low or inactive state.

The speed at which the rotor 12 will rotate may be determined by the average power applied to the coil phases φ1, φ2, φ3 over a period of rotation. The motor speed is a function of a variable or fixed signal input, e.g. which may be determined by the application in which the motor is used; and that signal is provided to the integrated circuit 90 at the input SPEED. Average power to the coil phases may be determined or controlled by pulse width modulating the power supplied to the coil phases by the power transistor QP. Based on the signal supplied to the SPEED input of the integrated circuit 90, the integrated circuit determines the pulse width of the pulse width modulated signal PWM PWR which in turn drives the power transistor QP. As a result, the commutation circuit 80 is actually powered by pulse width modulated power, as shown in FIG. 19. The basic chop frequency of the PMW PWR signal from the integrated circuit 90 is preferably in the range of 20-30 Kilohertz (Khz) although higher or lower frequencies may be employed. The 20-30 Khz chop frequency is at least a decade higher than other system time constraints and thus simulates an essentially constant power input to the commutation circuit 80.

The percentage of the chop frequency duration during which power is applied determines the average power supplied to the commutation circuit 80. The uppermost signal in FIG. 19 represents an exemplary signal in which power is applied during 20 percent of the chop frequency, thus resulting in a 20 percent duty cycle. As a result, the motor 10 will operate at 20 percent of its maximum speed. The middle and lower signals represent exemplary duty cycles of 50 and 80 percent, respectively. In the preferred embodiment the speed of the motor may vary continuously between a minimum and maximum value by varying the duty cycle of the power to the commutation circuit 80.

Figure 20:
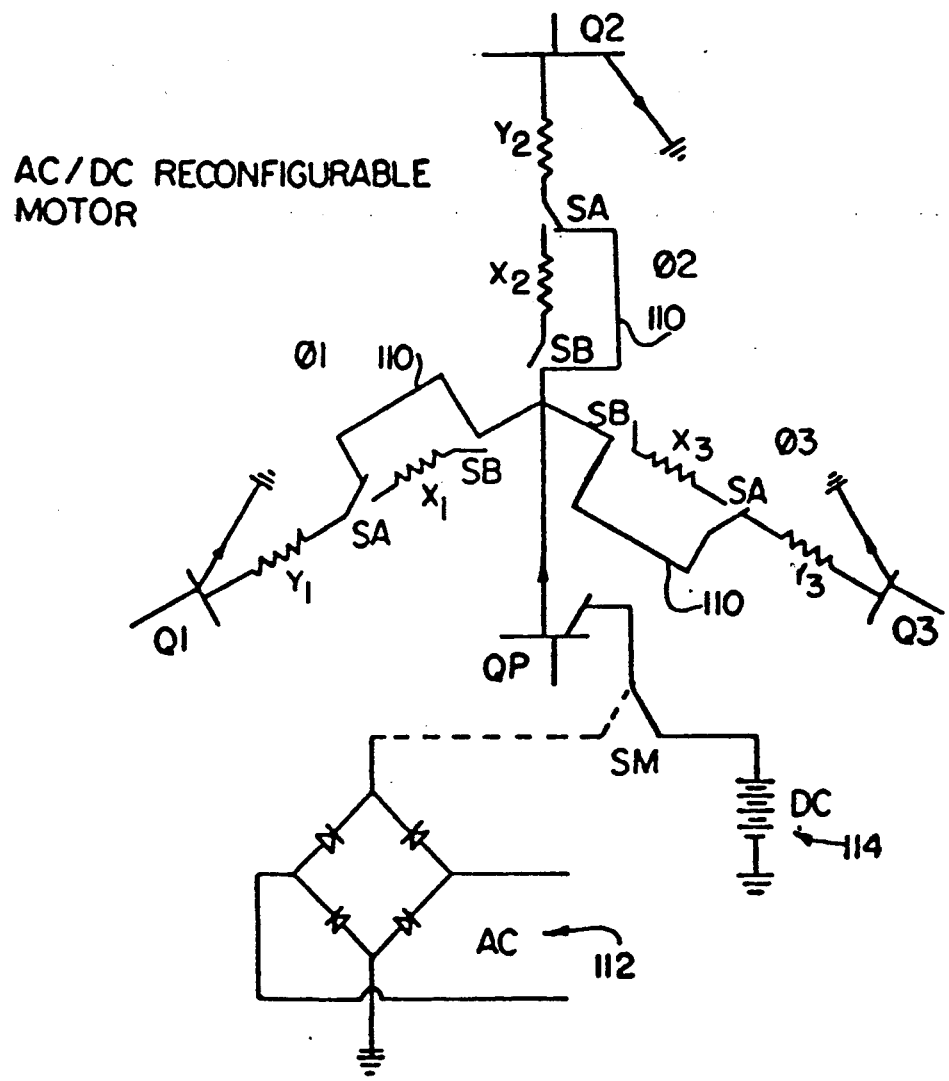
FIG. 20 is a schematic electrical circuit diagram of the commutation scheme and power supply of an alternate embodiment of the present invention suitable for use with DC or AC power.

The motor may also be configured to operate interchangeably with an alternating current (AC) or direct current (DC) power supply. To produce the same output torque at the same speed for different power supplies, i.e., AC and DC, the field winding 22 may be configured as shown in FIG. 20. For a ¼ horsepower motor an AC power requirement would be on the order of approximately 115 VAC at 2 amps while a DC power requirement to produce the same horsepower would be approximately 12 VDC at 18.5 amps. Consequently, to have the same output torque, which as discussed previously is a function of the number of coil turns and the applied current, each phase of the commutation circuit 80 must have two sets of windings, one for AC power and one for DC power. (The AC coils are denoted as $X_1, X_2, X_3$, DC coils are denoted as $Y_1, Y_2, Y_3$.)

The commutation circuit is again configured as a Wye With each coil phase φ1, φ2 and φ3 having two respective switching elements SA, SB and a respective commutation transistor Q1, Q2, Q3. When configured to operate on direct current, as shown in FIG. 20, switch SB is open and switch SA is in position to bypass the AC coil set $X_n$. DC power thus will flow only through the DC coil set $Y_n$ which is generally wound of a lower gauge wire than the AC coil set $X_n$ to handle the higher DC amperage. Power flow bypasses the AC coil set through the line 110. When configured to operate on AC power, the switch SB is closed (not shown) and the switch SA is in position to cooperate with switch SB to conduct current through the AC coil set $X_n$. Alternating current will then flow through both the AC coil set $X_n$ and the DC coil set $Y_n$.

When configured to operate on DC power, the power conditioning circuit 92 is bypassed, thus allowing 12 volt DC power to be supplied to the integrated circuit 90 and the position sensors 88.

In either the AC or DC configuration current flow to the commutation circuit is regulated by the power transistor QP as controlled by the integrated circuit 90. The power supplied to the power transistor QP is determined by switch SM which may be positioned to supply power from the unfiltered, full wave rectified AC power supply 112 or the DC power supply 114. Preferably the action of the switches SA and SB are coupled to the switch SM so that the former will automatically configure to the AC or DC power configuration depending on the position of switch SM. The switch SM may be external to the motor to allow manipulation by a user or internal and manipulated such as by insertion of a power supply or power supply cord.

It will be appreciated by one of ordinary skill in the art that although the features of the invention are described above with respect to an electromechanical device in the form of a slotless, brushless, large air-gap electric motor, many of the features may be used in conjunction with other motors, generators and similar electrical and electromechanical devices. For example, the commutation scheme described herein could be used in a typical slotted, brushless motor and the magnetically permeable flux shorting elements could be employed in many motors or equivalent devices that establish a rotating magnetic field, to name but a few.

What is claimed is:

1. A slotless, brushless, large air gap electric motor, comprising:
    a stator having a field winding and field backiron; said field winding having a plurality of coil segments, each of said coil segment including a plurality of electrically conductive turns of a polygonal shape, said turns in each coil segment having circumferentially opposite sides, and said circumferentially opposite sides of relatively adjacent turns being circumferentially offset with respect to one another in the same circumferential direction; and
    a rotor disposed within said stator, said rotor including a shaft with a permanent magnet mounted thereon.

2. The motor of claim 1, wherein said polygonal shaped turns are hexagonals.

3. The motor of claim 1, wherein said polygonal shaped turns are hexagonals.

4. The motor of claim 1, wherein said electrically conductive turns are electrically connected in series.

5. The motor of claim 1, wherein individual segments of said electrically conductive turns are electrically connected in parallel.

6. The motor of claim 1, wherein said field winding is insulated copper wire.

7. The motor of claim 1, wherein said field winding is electrically connected to form a three phase winding.

8. The motor of claim 7, wherein said field winding is electrically connected to a commutation circuit having a Wyen configuration.

9. The motor of claim 8, wherein such commutation circuit is controlled by an integrated circuit.

10. An electric motor comprising:
    a stator having a field winding and field backiron; and
    a rotor disposed within said stator including a shaft, a permanent magnet mounted thereon, and means for shorting a magnetic field emanating from either axial side of said permanent magnet to complete a magnetic circuit between opposite poles of said permanent magnet.

11. The motor of claim 10, wherein said means for shorting such magnetic field includes a pair of magnetically permeable elements mounted on said shaft on either side of said permanent magnet.

12. The motor of claim 10, wherein said field backiron is composed of relatively small diameter magnetically permeable wire.

13. The motor of claim 12, wherein said field backiron is wound with said magnetically permeable wiring.

14. The motor of claim 11, wherein said magnetically permeable elements are soft iron washers.

15. The motor of claim 10, further including bearing means positioned on said rotor with said means for shorting located between said bearing means and said permanent magnet.

* * * * *